United States Patent
Reichert et al.

(10) Patent No.: US 6,827,381 B1
(45) Date of Patent: *Dec. 7, 2004

(54) GRIPPER OR CLAMPING DEVICE

(75) Inventors: Andreas Reichert, Oberstenfeld (DE); Harry Grunwald, Meimsheim (DE); Ulrich Arnold, Bönnigheim (DE)

(73) Assignee: Fritz Schunk GmbH & Co. KG Fabrik fur Spann-und Greifwerkzeuge (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 119 days.

(21) Appl. No.: 08/798,148

(22) Filed: Feb. 10, 1997

(30) Foreign Application Priority Data

Feb. 9, 1996 (DE) .......................................... 196 04 649

(51) Int. Cl.⁷ ................................................ B25J 15/08
(52) U.S. Cl. ..................... 294/88; 294/119.1; 294/907; 901/37; 901/46
(58) Field of Search .......................... 294/88, 94, 119.1, 294/116, 907; 901/37, 46

(56) References Cited

U.S. PATENT DOCUMENTS

| | | | |
|---|---|---|---|
| 4,682,805 A | * | 7/1987 | Reynolds .................... 294/907 |
| 4,768,821 A | * | 9/1988 | Hucul et al. ................. 294/907 |
| 5,090,757 A | * | 2/1992 | Huber et al. .............. 294/119.1 |
| 5,125,708 A | * | 6/1992 | Borcea et al. ................. 294/88 |
| 5,190,334 A | * | 3/1993 | Sawdon ........................ 294/88 |
| 5,762,391 A | * | 6/1998 | Sumnitsch ............... 294/119.1 |

FOREIGN PATENT DOCUMENTS

| | | | |
|---|---|---|---|
| DE | 3306526 A1 | 8/1984 | |
| DE | 35 13 648 A1 | 10/1986 | |
| DE | 87 13 238.9 | 3/1988 | |
| DE | 263-740 | * 1/1989 | .............. 294/119.1 |
| DE | G 89 04 108.9 | 7/1989 | |
| DE | G 92 14 477.2 | 2/1993 | |
| DE | 43 20 071 A1 | 1/1994 | |
| EP | 0 503 191 A1 | 9/1992 | |

* cited by examiner

Primary Examiner—Dean J. Kramer
(74) Attorney, Agent, or Firm—Bacon & Thomas, PLLC; Felix J. D'Ambrosio

(57) ABSTRACT

In a gripper device for manually operated or automatic handling devices, having a gripper housing, at least one base jaw displaceably seated in the gripper housing, and a drive for the base jaw, wherein the drive comprises a hydraulically or pneumatically chargeable piston displaceably seated in a cylinder and a spline hook gear, an optimal sealing of the base jaw in the gripper housing is achieved in that the base jaw has a sealed, for example circular or polygonal, cross section at least in the section extending from the gripper housing when the gripper device is opened.

18 Claims, 3 Drawing Sheets

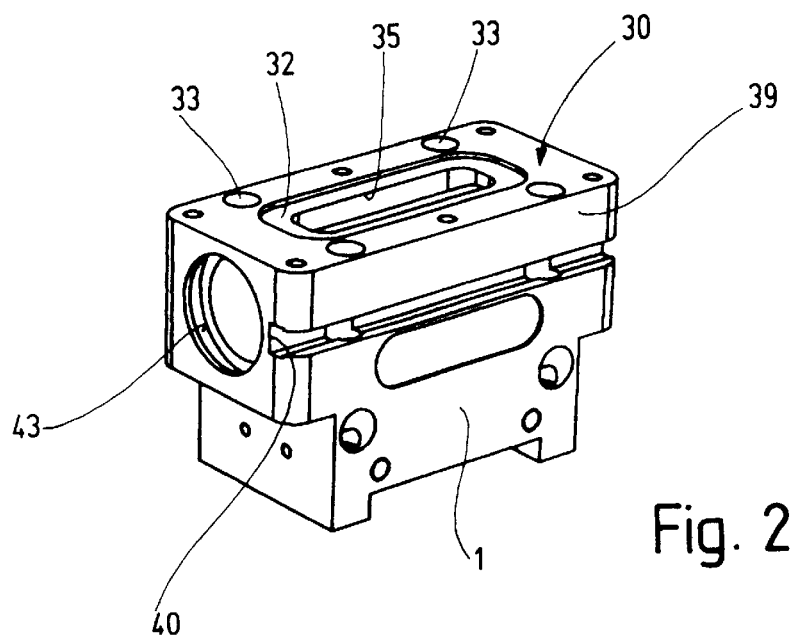
Fig. 2
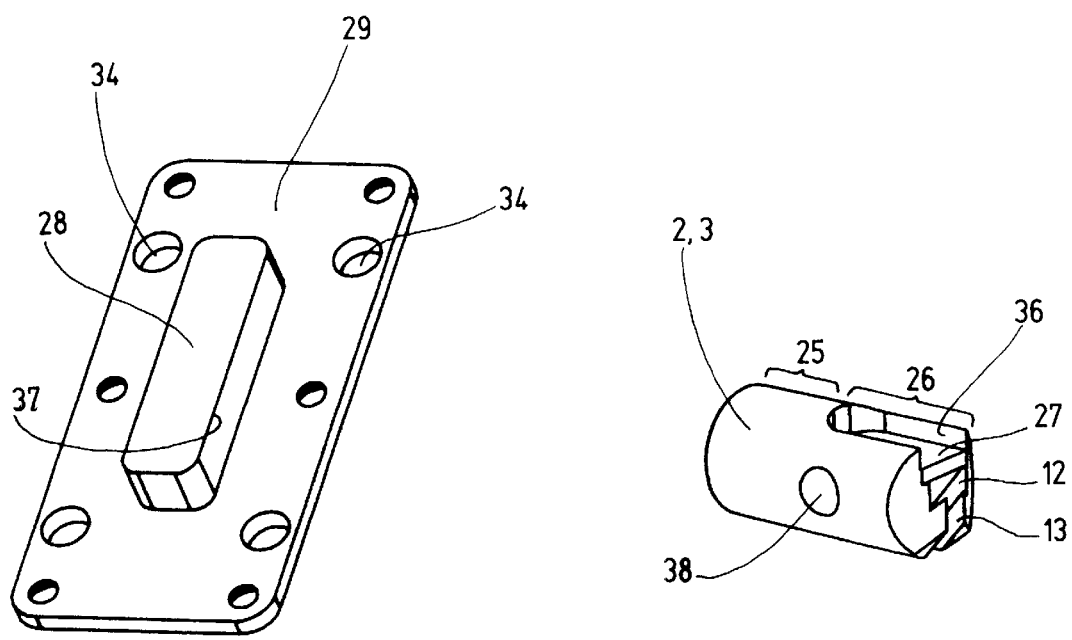
Fig. 3
Fig. 4

GRIPPER OR CLAMPING DEVICE

BACKGROUND OF THE INVENTION

1. Technical Field

The present invention relates to a gripper or clamping device for manually operated or automatic handling devices, having a gripper housing, at least one base jaw displaceably seated in the gripper housing, and a drive for the base jaw, wherein the drive comprises a hydraulically or pneumatically chargeable piston displaceably seated in a cylinder and a spline hook gear.

2. Background Art

A gripper device of this type is known from DE 89 02 325 U1, for example. In order to be able to grip tools simply and yet precisely with a handling device or a robot arm, parallel grippers which are pneumatically or hydraulically actuated are employed as a rule. In the process a piston, which is displaceably seated in a cylinder provided in the gripper housing, is acted upon by a pressure medium. A spline hook gear is actuated by the displacement of the piston, so that the gripper jaws are extended out of the gripper housing or are retracted into the gripper housing. The base jaws have a T-shaped cross section and are seated in appropriate guides. The essential advantage of these base jaws, besides the relatively large gripping force, is the great lateral stability and small tendency for tilting. However, it has been found that the base jaws, and in particular their running surface, are subject to great wear, since the rinsing fluid which is sometimes used in the work area washes the lubricants off the guide surfaces because of the open guides, and furthermore, dirt particles penetrate between the housing and the base jaws. The dirt particles in particular cause a great amount of abrasion on the sliding surfaces, so that exact guidance and freedom from play is lost after a short time.

SUMMARY OF THE INVENTION

The present invention is therefore based on the object of further developing a gripper device of the type mentioned at the outset in such a way that wear is reduced, even when it is used in very dirty areas and also in case of contamination with rinsing liquids and similar fluids, and that the gripper device still moves easily even after longer use.

This object is attained in accordance with the present invention in that the base jaw has a sealed, for example circular or polygonal, cross section at least in the section extending from the gripper housing when the gripper device is opened.

The circularly shaped base jaws can be guided in a considerably more sealed manner in the housing, since the passages or receiving openings for the base jaws in the gripper housing can be manufactured considerably more precisely than a T-shaped opening for T-shaped base jaws. Neither foreign particles nor liquids can enter into the space between the housing and the base jaws because of the more precise fabrication of these receiving openings. The service life of such a gripper device is increased considerably over that of the known gripper devices in accordance with the prior art.

In connection with a preferred further embodiment it is provided that the housing is equipped with sealing elements enclosing the circular section of the base jaws. These sealing elements have the purpose of closely surrounding the base jaws and by means of this to prevent the possible further penetration of solid bodies or liquids or even gases. In addition, the sealing elements have the advantage that no lubricant emerges from the housing.

In order to protect the seals of the sealing elements, they can be advantageously provided with strippers, so that dirt and liquid adhering to the base jaws is stripped off. In this case the seals and strippers are advantageously combined into a single sealing element or are made of one piece. The latter is inserted into the housing in the area of the housing opening. The gripper in accordance with the present invention can now also be employed without problems in very dirty rooms where, for example, cast parts are dressed and abrasive cast dust accumulates.

In a further embodiment of the gripper device it is provided in accordance with the present invention that at least one of the base jaws is equipped with a protection against torsion. The lateral stability of the base jaws and therefore that of the gripper jaws is considerably increased by means of this protection against torsion, and the tendency to tilt is reduced. The workpieces can now be gripped and held by the gripper jaws which are secure against torsion.

It is provided in connection with a preferred embodiment that the protection against torsion has a groove provided in the base jaw, which is engaged by a feather key supported on the housing. In this case the groove for the feather key extends parallel with the longitudinal axis of the base jaw, wherein the groove is only provided in the section of the base jaw which remains in the housing. The section of the base jaw being extended out of the housing therefore has no groove, so that sealing is assured.

In order to be able, in a simple, but effective manner to compensate for tolerances, the feather key is floatingly seated in the housing, i.e. the feather key is fastened on a housing cover and is in particular made of one piece with it. In this way the insertion of the feather key into the grooves of the base jaws is possible without problems, even if the grooves in the base jaw are not exactly aligned with the housing opening receiving the feather key. The housing is open in the area of the groove, wherein this opening, however, is wider as well as longer than the feather key, and this housing opening can be closed by means of a cover which has the feather key. The feather key is inserted into the corresponding grooves when the cover is placed on the housing and the housing is closed, and as a result the base jaws are secured against torsion. Therefore the entirety of the forces acting on the feather key are supported by means of the cover of the housing. Large forces can be transmitted because of the relatively wide cover.

In one exemplary embodiment it is provided that the protection against torsion for the base jaws is provided on the sides opposite the drive for the base jaws. In this way both assembly and maintenance are made easier. The cover having the feather key is advantageously screwed to the housing and sealed in respect to the housing. By means of the screwed attachment it is possible to compensate for tolerances regarding the position of the grooves in the base jaws and the housing.

Because, in accordance with the present invention, the chamber of the housing with the spline hook gear is fluidically connected with the side of the cylinder chamber facing away from the spline hook gear, no underpressure is generated when the base jaws are extended or the base jaws are retracted into the housing. Underpressure would have the serious disadvantage that gases or liquids, for example rinsing liquid, could be aspirated through the gap between the base jaws and the housing, because of which the lubricant film on the base jaws could be destroyed. Furthermore, dirt would be carried in by these liquids. The connection of this spline hook gear chamber with the chamber which is under pressure when the base jaws are extended has the considerable advantage that the spline hook gear chamber is always under pressure and therefore no medium can enter, at most fluids could run out in case of leaks.

The base jaws can preferably be equipped with gripper jaws on the front. These are flanged to them, for example by means of screws, wherein they can be centered in addition.

The base jaws can preferably be retracted completely over their entire length into the housing. In the process they are completely surrounded over their entire length by the housing, so that only their front ends, on which the gripper jaws are fastened, are accessible. This has the considerable advantage that in the course of retraction into the housing the base jaws are both cleaned and also freshly lubricated.

In one exemplary embodiment the base jaws advantageously have receptacle openings for elements for position determination. The open position and the closed position of the gripper device can be determined by means of position detection elements, and the controls can be correspondingly triggered.

The present invention is not limited to two-finger parallel grippers, for example, but also includes grippers with several base and gripper jaws, for example three-finger centric grippers.

Further advantages, features and details of the present invention ensue from the following description, wherein two particularly preferred exemplary embodiments are described in detail, making reference to the drawings. The features represented in the drawings and mentioned in the claims and specification can be important for the present invention here either individually by themselves or in any arbitrary combination. The drawings show in:

BRIEF DESCRIPTION OF THE DRAWINGS

FIG. 2 is a perspective plan view of the housing of the gripper device in FIG. 1, FIG. 3 is a perspective plan view of a housing cover in an enlarged representation, FIG. 4 is a perspective representation of a base jaw.

DESCRIPTION OF THE PREFERRED EMBODIMENTS

Figure 1:
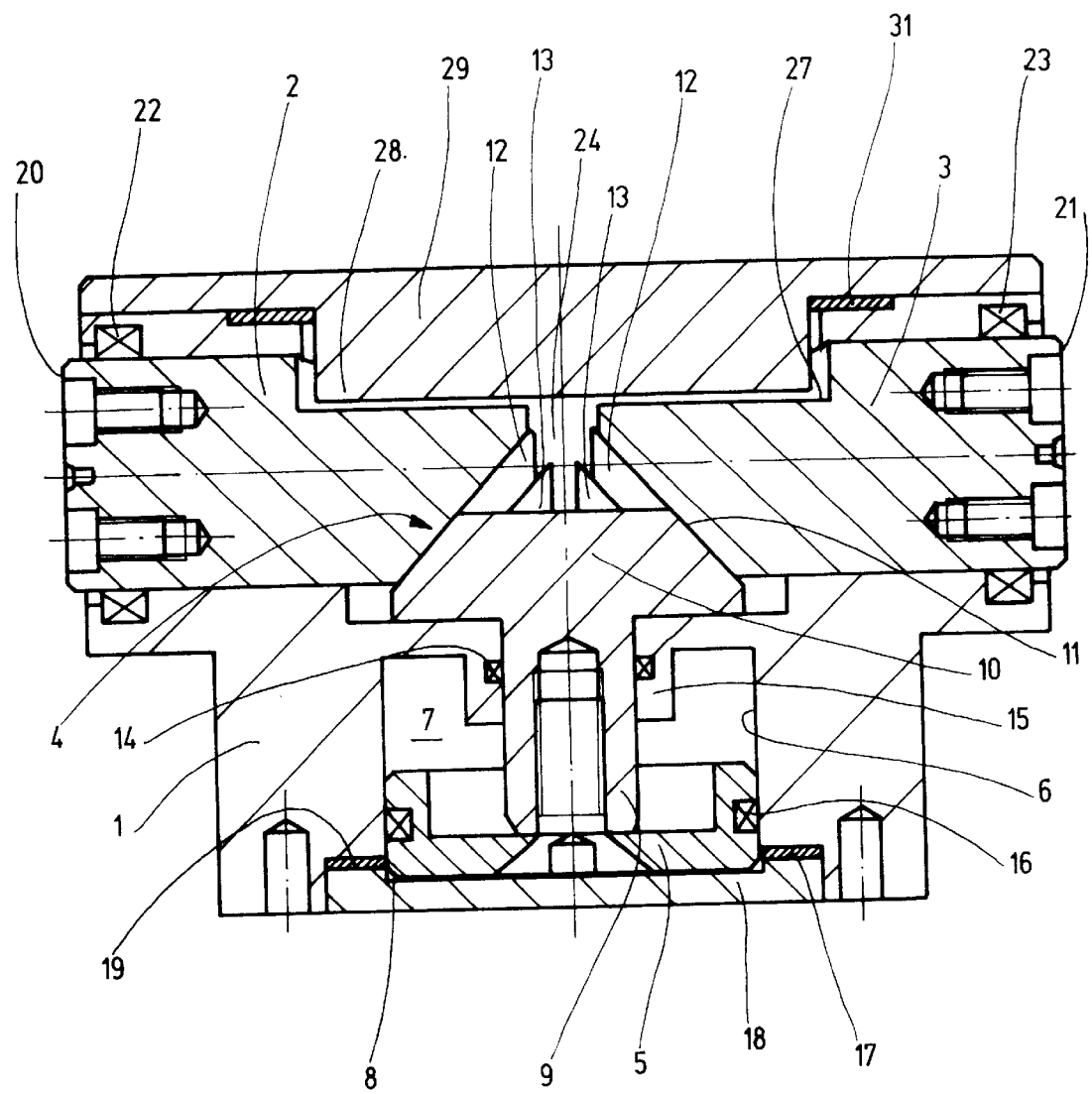
FIG. 1 is a longitudinal section through a first embodiment of the gripper device in accordance with the present invention.

The representation shown in FIG. 1 is a longitudinal section through a two-finger parallel gripper with a housing 1, two base jaws 2 and 3, a drive 4 for the base jaws 2 and 3, and a piston 5 displaceably seated in a cylinder 6. The housing 1 has an essentially T-shaped cross section, wherein the two base jaws 2 and 3 are displaceably seated in the two oppositely located legs of the housing 1. The leg of the housing 1 which is vertical with respect to these legs has the cylinder 6, which is divided into two cylinder chambers 7 and 8 by the piston 5. In FIG. 1, the piston 5 is in its one end position, in which the two base jaws 2 and 3 are retracted into the housing 1 by means of the drive 4. In this position of the piston 5 the cylinder chamber 8 takes up its minimal and the cylinder chamber 7 its maximum volume.

The piston 5 is screwed onto piston rod 9, wherein the piston rod 9 makes a transition into the head 10 of a spline hook gear 11, which constitutes the drive 4. The head 10 is coupled by means of the spline surfaces, known per se, with corresponding spline surfaces 12, 13 of the base jaws 2 and 3. A movement of the piston 5 in the vertical direction is deflected by means of the spline hook drive 11 into a movement of the base jaws 2 and 3 with the horizontal direction, i.e. orthogonally in respect to the movement direction of the piston 5. In the process both tension and pressure forces are transmitted.

A seal 14, which encloses the piston rod 9 and is seated in a housing shoulder 15 which guides the piston rod 9, a seal 16, which is cut into the circumferential surface of the piston 5 and seals the piston 5 with respect to the wall of the cylinder 6, and a flat seal 17, which seals the cylinder chamber 8 against the atmosphere, are used for sealing the cylinder chambers 7 and 8. The flat seal 17 is situated between a housing cover 18 and the bottom of a recess 19 in the housing 1 for receiving the housing cover 18.

It can furthermore be seen in FIG. 1 that in the area of their free front faces the two base jaws 2 and 3 are enclosed by respectively one sealing element 22 or 23 (first sealing means), so that the interior chamber 24 receiving the base jaws 2 and 3 is sealed against the atmosphere. The sealing elements 22 and 23 consist of a seal and a stripper, these two elements being combined in the sealing elements 22 or 23. It is also to be pointed out that the interior chamber 24 is directly or indirectly connected with the cylinder chamber 8 by means of a conduit, not shown. It is prevented in this way that an underpressure is created in the interior chamber 24 when the base jaws 2 and 3 are extended out of the housing 1.

A base jaw 2 or 3 is represented in FIG. 4, wherein the circular cross section of the section 25 (first section) extending out of the housing 1 is clearly discernible. The section 26 (second section) is provided with a longitudinal groove 27 (rotation-protection means), which is situated opposite to the spline surfaces 12 and 13 and therefore of the drive 4 in relation to the longitudinal axis. The longitudinal groove 27 is open toward the exterior and suited for receiving a feather key 28 (FIGS. 1 and 3). This feather key 28 is formed as one piece with a housing cover 29, as can also be seen in FIGS. 1 and 3. In the course of extending the two base jaws 2 and 3, the longitudinal grooves 27 of these two base jaws 2 and 3 slide along the feather key 28, while the feather key 28, however, remains in continued engagement with the longitudinal groove 27. A protection against torsion for the two base jaws 2 and 3 is created by means of the groove and key connection, by means of which not only a great lateral stability is assured, but tilting of the base jaws 2 and 3 is also prevented.

Following the insertion of the feather key 28 into the corresponding longitudinal grooves 27 of the base jaws 2 and 3, the housing cover 29 is screwed to the top (FIG. 2) of the housing 1 and the connection of the feather key 28 with the housing is provided in this way. A seal 31 is inserted into a recess 32 provided for the seal between the housing cover 29 and the housing 1. The interior housing chamber 24 is sealed in this way on the cover side. Because of negligible tolerances in the threaded bores 33 of the housing 1 and the screw holes 34 of the housing cover 29, the housing cover 29 can lightly float on the top 30 of the housing 1 before the screws are tightened, which has the advantage that tolerances when cutting the longitudinal groove 27 can be compensated. The housing opening 35 is selected to be correspondingly large, so that the feather key 28 can be slightly displaced in this housing opening 35.

It can be stated in summation that with this first embodiment an optimal seal of the housing interior 24 with respect to the atmosphere is achieved by the circular shape of the section 25 of the base jaws 2 and 3, so that neither fluids nor solid particles can enter and damage the running surfaces. A protection against torsion is achieved in that the flanks 36 of the longitudinal groove 27 can be supported on the lateral faces 37 of the feather key 28, wherein the feather key 28 is rigidly connected with the housing 1 by means of the screwed connection of the housing cover 29.

In addition, a lateral opening 38 in the basic jaw 2 or 3 can be seen in FIG. 4, into which elements for position detection, for example a magnet or the like, can be inserted. Such an opening is also located on the opposite side of the base jaw 2 or 3 (facing away from the viewer in FIG. 4) which, however, has been disposed offset with respect to the opening 38, i.e. it is further displaced in the direction toward the front face 20 or 21 or in the direction of the oppositely located side having the spline surfaces 12 and 13. The two base jaws 2 and 3 are embodied to be identical, so that by means of the magnet in the one opening 38 the extended position, for example, can be determined, and by means of the magnet in the other opening the retracted position of the base jaw 2 or 3.

Sensors, for example Hall sensors fastened on the exterior of the housing, cooperate with the elements located in the base jaws 2 and 3. To this end a lateral face 39 of the housing 1 has a longitudinal groove 40, which is provided parallel with the axis of displacement of the base jaws 2 and 3 and on their level. Sensors, for example Hall sensors, can be inserted into this longitudinal groove 40 and fixed in place in any arbitrary position.

Figure 5:
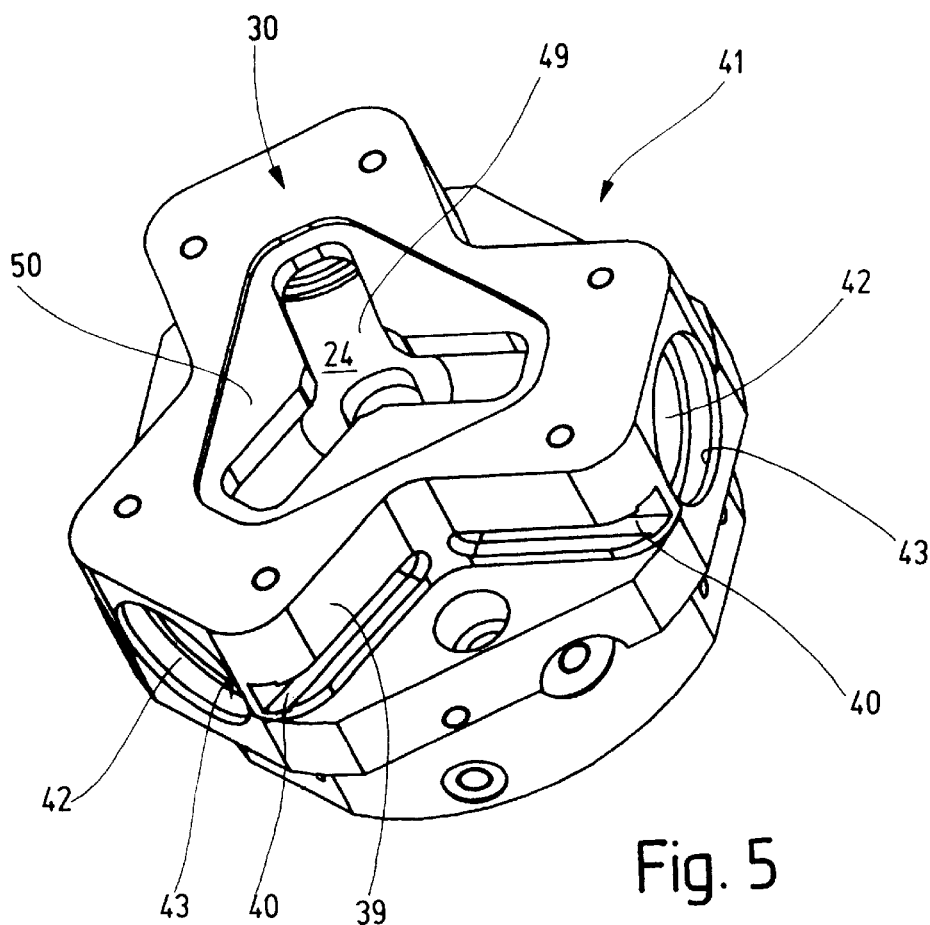
FIG. 5 is a perspective representation of a housing of a second embodiment of the gripper device of the present invention for three base jaws.
Figure 6:
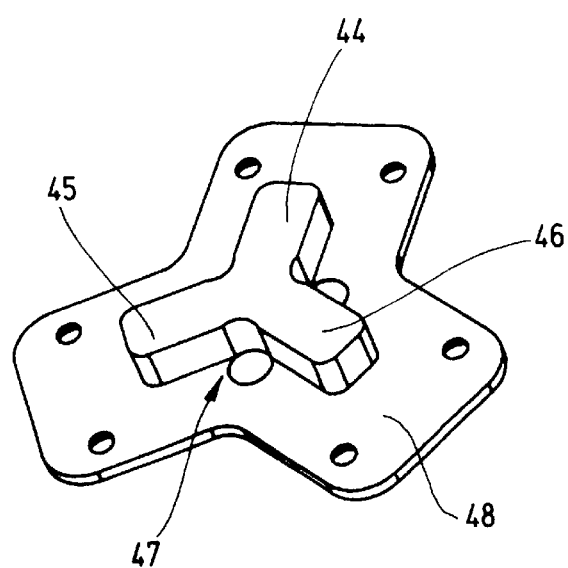
FIG. 6 is a perspective representation of a housing cover for the housing in accordance with FIG. 5.

A second exemplary embodiment of the present invention is represented in FIGS. 5 and 6, wherein this gripper device can be equipped with a total of three base jaws (FIG. 4). To this end the gripper housing 41 has three receiving bores 42, into which the base jaws can be inserted. Here, too, sealing elements can be inserted into corresponding circumferential grooves (corresponding to FIG. 2), which cause sealing as well as the stripping off of dirt from the surfaces of the base jaws. In this exemplary embodiment the protection against torsion is also obtained by means of a groove-spline connection, wherein a leg 44, 45, or 46 of a feather key 47 respectively engages the longitudinal grooves 27 of the base jaws. This feather key 47 is also formed on a housing cover 48, essentially embodied in a star-shape, and engages a housing opening 49 of the gripper housing 1. Sealing of the housing cover 48 against the interior housing chamber 24 takes place by means of a seal inserted between the housing cover 48 and a recess 50. Following the insertion of the feather key 47 into the corresponding longitudinal grooves 27 of the base jaws, the housing cover 48 is screwed on the top 30 of the gripper housing 41. The feather key 47 is floatingly seated prior to tightening the screws, which is used for compensating the tolerances.

The gripper housing 41 is also provided with longitudinal grooves 40 on the lateral surface 39, into which sensors, by means of which the position of the gripper jaws can be scanned, can be inserted and fixed in place.

What is claimed is:

1. A gripper device for handling devices, comprising:
   a gripper housing, said gripper housing having a cylindrical space and at least one further space;
   a cover for said gripper housing;
   at least one base jaw displaceably seated in said further space, said at least one base jaw being a solid, one piece jaw; and
   drive means for said at least one base jaw accessible to said further space, said drive means including a piston displaceably seated in said cylindrical space, and a spline hook gear engageable with said piston and said at least one base jaw, wherein each base jaw has:
      a first section having a circular cross section, said first section extending out of said gripper housing when the gripper device is opened;
      first sealing means for sealing said first section in said gripper housing;
      a second section provided with rotation-protection means, said rotation protection means acting directly against said cover of said gripper housing, and said rotation protection means being retained in said gripper housing when the gripper device is opened and said first section is driven fully out of said gripper housing; and
      said rotation-protection means is a separate means with respect to said drive means.

2. The gripper device as defined in claim 1, wherein said first sealing means are provided with seals and strippers besides said seals, said strippers serving to remove foreign bodies from said first section.

3. The gripper device as defined in claim 1, wherein at least one of said at least one base jaws includes means providing protection against torsion.

4. The gripper device as defined in claim 1, wherein said at least one further space receives said spline hook gear, said at least one further space is fluidly connected with the side of said cylindrical space facing away from said spline hook gear.

5. The gripper device as defined in claim 1, wherein both of said spaces are pressurized.

6. The gripper device as defined in claim 1, wherein said base jaws are equipped with gripper jaws on their front.

7. The gripper device as defined in claim 1, further comprising:
   position determining elements, said base jaws having a receptacle opening for receiving a respective position determining element.

8. The gripper device as defined in claim 1, wherein a plurality of base jaws are provided which are evenly distributed about said gripper housing.

9. A gripper device for handling devices, comprising:
   a gripper housing, said gripper housing having a cylindrical space and at least one further space;
   at least one base jaw displaceably seated in said further space; and
   drive means for said at least one base jaw accessible to said further space, said drive means including a piston displaceably seated in said cylindrical space, and a spline hook gear engageable with said piston and said at least one base jaw, wherein each base jaw has:
      a first section having a circular cross section, said first section extending out of said gripper housing when the gripper device is opened;
      first sealing means for sealing said first section in said gripper housing; and a second section provided with rotation-protection means, said rotation-protection means acting directly against said gripper housing, and said rotation-protection means being retained in said gripper housing when the gripper device is opened and said first section is driven fully out of said gripper housing, wherein said rotation-protection means is separate from said drive means, wherein at least one of said at least one base jaws includes means providing protection against torsion, and wherein said means providing protection against torsion comprises a feather key supported on said gripper housing and said rotation-protection means formed as a longitudinal groove provided on said base jaw engaged by said feather key.

10. The gripper device as defined in claim 9, further comprising:

a cover to which said feather key is fastened.

11. The gripper device as defined in claim 10, wherein said cover and said feather key are formed as one piece.

12. The gripper device as defined in claim 10, further comprising:

second sealing means for sealing said cover against said gripper housing.

13. The gripper device as defined in claim 9, wherein the protection against torsion is provided on the side opposite said drive means.

14. The gripper device as defined in claim 9, wherein said gripper housing includes an opening providing access to said longitudinal groove, and wherein said opening is closable by said cover.

15. The gripper device as defined in claim 9, wherein said cover can be secured to said gripper housing by screwing.

16. A gripper device for handling devices, comprising:

a gripper housing, said gripper housing having a cylindrical space and at least one further space;

at least one base jaw displaceably seated in said further space; and drive means for said at least one base jaw accessible to said further space, said drive means including a piston displaceably seated in said cylindrical space, and a spline hook gear engageable with said piston and said at least one base jaw, wherein each base jaw has:

a first section having a circular cross section, said first section extending out of said gripper housing when the gripper device is opened;

first sealing means for sealing said first section in said gripper housing; and a second section provided with rotation-protection means, said rotation protection means acting directly against said gripper housing, and said rotation-protection means being retained in said gripper housing when the gripper device is opened and said first section is driven fully out of said gripper housing, wherein said rotation-protection means is separate from said drive means, and wherein said base jaws can be completely retracted into said gripper housing over their entire length.

17. A gripper device for handling devices, comprising:

a gripper housing, said gripper housing having a cylindrical space and at least one further space;

at least one base jaw displaceably seated in said further space;

drive means for said at least one base jaw accessible to said further space, said drive means including a piston displaceably seated in said cylindrical space, and a spline hook gear engageable with said piston and said at least one base jaw; and a cover for said gripper housing including means for engaging each base jaw wherein:

a longitudinal groove formed in each base jaw being engaged by said means for engaging each base jaw to provide thereby rotation protection.

18. A gripper device for handling devices, comprising:

a gripper housing, said gripper housing having a cylindrical space and at least one further space;

at least one base jaw displaceably seated in said further space; and drive means for said at least one base jaw accessible to said further space, said drive means including a piston displacably seated in said cylindrical space, and a spline hook gear engageable with said piston and said at least one base jaw, wherein each base jaw has:

a first section having a circular cross section, said first section extending out of sid gripper house when the gripper device is opened;

first sealing means for sealing said first section in said gripper housing;

a second section having a circular cross section substantially equal to that of said first section and being provided with rotation-protection means, said rotation-protection means acting directly against said gripper housing, and said rotation-protection means being retained in said gripper housing when the gripper device is opened and said first section is driven fully out of said gripper housing; and said rotation-protection means separate means with respect to said drive means.

* * * * *